March 1, 1938.   F. F. HILLIX   2,109,482

SPEED COMPARATOR

Filed March 31, 1934   2 Sheets-Sheet 1

INVENTOR
FOSTER F. HILLIX
BY
Brockett, Hyde, Higley & Meyer
ATTORNEYS

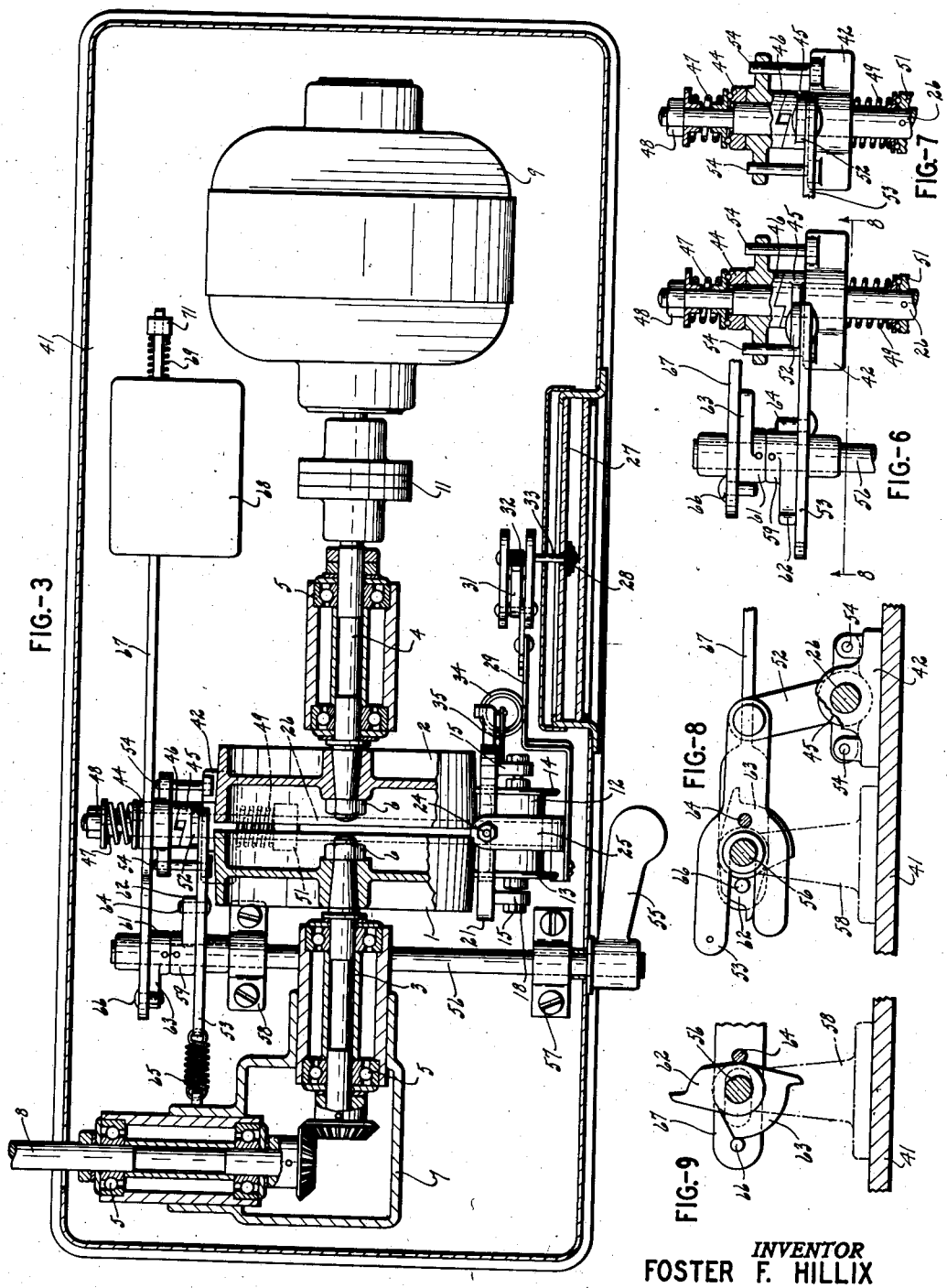

Patented Mar. 1, 1938

2,109,482

UNITED STATES PATENT OFFICE 2,109,482

SPEED COMPARATOR

Foster F. Hillix, Lakewood, Ohio, assignor to Industrial Rayon Corporation, Cleveland, Ohio, a corporation of Delaware Application March 31, 1934, Serial No. 718,523

16 Claims. (Cl. 235—103.5)

This invention relates to a device for comparing the speed of two rotating parts. More particularly the invention relates to a speed comparator for comparing the speed of a rotating part with the speed of a standard which is rotating at a known rate.

Briefly, the invention in its preferred form comprises two aligned rotatable surfaces, such as drums, one being driven at a known constant speed, as by a synchronous motor, and the other being driven by the part the speed of which is to be measured. A spool-like member is freely mounted so that one of its flanges rests against each of the rotatable surfaces mentioned. The rotatable surfaces have a regularly varying contour, preferably that of a frustum of a cone, and the spool moves about until its flanges are riding on portions of the two surfaces which have the same speed of rotation. The lateral movement imparted to the spool by this effect operates a dial pointer or other indicating device to indicate the difference in speed between the unknown speed and the standard speed.

In many industries it is necessary that machine parts rotate at a definite constant rate of speed, otherwise the product will be unfavorably affected. For example, in the textile industries it is required that various thread-handling devices operate at an exact unvarying speed and particularly is this true in the artificial silk industry where yarn is being spun by a continuous process. The present invention aims to provide an apparatus which measures the difference between the speeds of two rotating bodies rather than the absolute speed of one of them and thus extreme accuracy can be obtained in comparing the speed of a body to be measured with that of a body known to be rotating at a constant speed.

It is, accordingly, an object of the invention to provide an apparatus for accurately comparing the speed of a rotating body with that of a known standard. Another object of the invention is to provide an apparatus in which the tendency for a freely rotatable body to contact with two rotating surfaces at points having the same peripheral speed is utilized to indicate any difference in speed between the two surfaces. Further objects of the invention will in part be obvious and will in part appear hereinafter.

In the accompanying drawings there has been illustrated a preferred embodiment of the invention but it will be understood that the same is capable of various modifications without departing from the scope of the invention.

Figure 1:
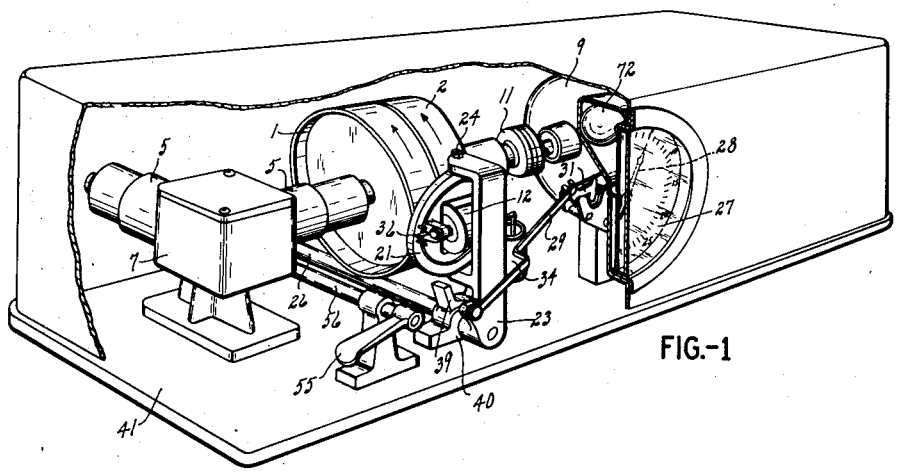
Figure 2:
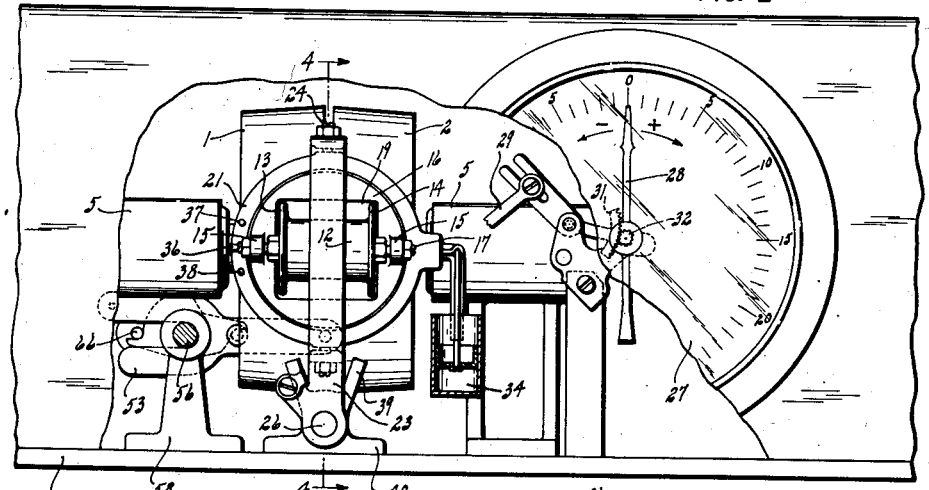
Figures 4, 5:
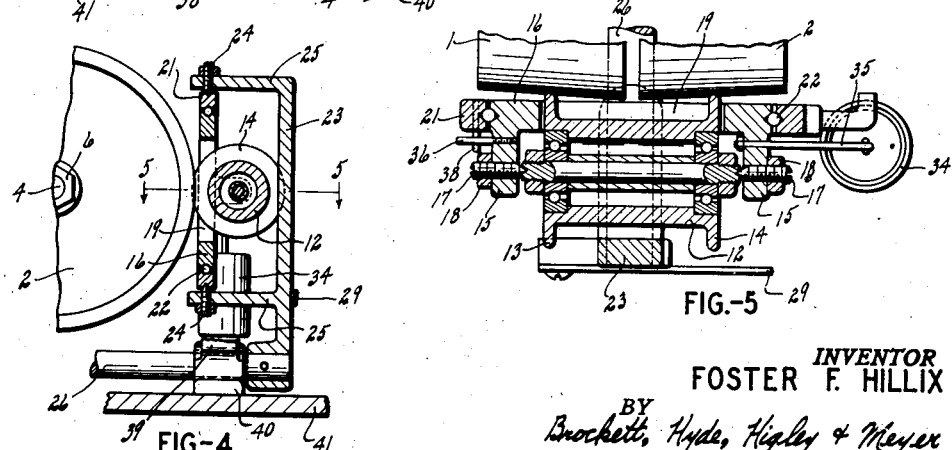

In said annexed drawings, Fig. 1 is a perspective of an apparatus embodying the invention; Fig. 2 is a front elevation of the same with parts broken away; Fig. 3 is a horizontal section through the apparatus; Fig. 4 is a vertical section taken along the line 4—4 of Fig. 2; Fig. 5 is a horizontal section taken along the line 5—5 of Fig. 4; Figs. 6 and 7 are plans, partly in section, of a portion of the operating mechanism for the apparatus; Fig. 8 is a vertical section taken along the line 8—8 of Fig. 6; and Fig. 9 is a similar section showing the operating mechanism in a different position.

Referring to the drawings, drums 1 and 2 are mounted on shafts 3 and 4, respectively, to rotate therewith, ball bearings 5 being provided to reduce friction as much as possible. The drums are rigidly fastened to their respective shafts by nuts 6 and drum 1 is adapted to be driven by any device, the speed of which is to be measured, through gear box 7 and shaft 8. Drum 2 is driven from a source of power having an absolutely constant rate of speed, such as the synchronous motor 9, through a coupling 11. The drums 1 and 2 have peripheries of such form that as the drums are rotated at speeds which are equal or not too different, they present bands on their peripheries which move at equal linear speeds. Preferably, the peripheries of such drums regularly vary in such a manner that the diameter of one drum at any given distance from the end of the drum which is adjacent to the other drum is equal to a corresponding diameter of the other drum at an equal distance from the end of said other drum which is adjacent said first-mentioned drum. The frustroconical form of the illustrated drums is an example of one shape of drum which has been found preferable.

Mounted adjacent the sloping surfaces of the drums is a spool-like member or element 12 having two flanges 13 and 14 which are adapted to contact with the respective drum surfaces. This spool is mounted in lugs 15 projecting from the face of a disk 16 lying in a vertical plane in front of the drums 1 and 2 and is accurately centered for rotation between the lugs on cone point screws 17 secured in the lugs by nuts 18. A rectangular aperture 19 in the disk 16 permits the flanges 13 and 14 of the spool to project therethrough and contact with the drum surfaces. The disk 16 is mounted in a gimbal ring 21 on ball bearings 22 and is thus free to turn therein in its own plane. The ring 21 is, in turn, mounted in a yoke and lever 23, as may be seen in Fig. 4, by means of cone point screws 24 which are secured in the horizontal flanges 25 of the yoke and lever. The yoke and lever 23 is fixed to a shaft 26 and turns therewith. It will be seen from the foregoing that the spool 12 is free to move in a number of directions due to its mounting. First, it is free to rotate on its own axis between the lugs 15, second, it may rotate about the axis of the disk 16, with which the lugs 15 are integral, third, it may turn about an axis passing through the cone point screws 24 since the gimbal ring 21 is free to turn about these screws, and fourth, it may swing with the yoke and lever 23 which turns with the shaft 26. As a result, the spool is free to seek a position of equilibrium in contact with the surfaces of both drums which rotate independently of each other.

If the two drums are now started rotating, one being driven by the part the speed of which is to be measured and the other being driven by a standard of constant speed, such as a synchronous motor, there will, perhaps, be some variation in the speed of the two drum surfaces, this difference being, however, small since the gear box 7 may be utilized to bring the two speeds to approximately the same magnitude. When the spool is brought in contact with the two drums thus rotating, such contact being practically frictionless, it will hunt a position where the flanges 13 and 14 will contact with bands on the two drums having the same peripheral speed. This is due to the fact that the spool can rotate at but one speed and the flange which is contacting with the slower moving surface will tend to be retarded thereby, while the flange which is contacting with the faster moving surface will tend to be accelerated thereby. This causes the spool, which is free to turn in the gimbal ring 21, to dip at a slight angle to the axis of the drums and the spool tends to move laterally toward the side which equalizes the speed. The spool, then, will come to rest when in the position where both flanges are being driven at the same rate of speed. The lateral movement thus imparted to the spool, being thus a function of the speed differential between the two drums, can therefore be utilized to measure the difference in speeds.

The desirability of thus mounting the spool member for rotating about a plurality of axes will be apparent from the foregoing since the spool must be free to move under the varying forces applied to it by the drums until it has found the position of equilibrium defined by relatively narrow bands on the two drums having the same velocities. Other means of mounting the spool can, of course, be used.

The effect of lateral movement of the spool member 12 as the flanges 13 and 14 seek bands of equal speed on the drums may be transmitted to an indicator which may be suitably calibrated to indicate any difference in speed between the two drums. This may consist, as shown, of a dial 27 with divisions marked thereon and a pointer 28 which is connected to the spool member 12. The connecting means illustrated includes a lever 29 pivotally connected to the yoke and lever 23 and pivotally connected to gear segment 31 which meshes with a pinion 32. A shaft 33 rigidly connects the pinion and the pointer 28. If, then, the spool 12 moves laterally until it has found bands on the two tapering drum surfaces where the speed is the same, it will swing the yoke and lever 23 correspondingly in one direction or the other about the axis of the shaft 26 and this movement will be communicated through the lever 29 to the gear segment 31 which turns the pinion 32 and the pointer 28. After appropriate calibration of the dial 27, any difference in speed between the two drums will be accurately indicated on the dial and, since it is the difference in speeds and not absolute speeds which is being measured, a difference of two or three revolutions per minute will move the pointer an appreciable distance, giving a fairly large reading. If this difference be applied to a constant speed standard rotating at, say 1800 R. P. M., it will be apparent that an accuracy within 0.2% may readily be attained.

In order to prevent vibration of the needle 28 and delay in securing a reading, a dash pot 34 has been provided, the same being connected to one of the lugs 15 by means of a rod 35 on the disk 16, thus dampening swings of the spool about the axis of the disk. This dash pot does not interfere with the function of the instrument nor does it render it sluggish, the effect, on the contrary, being to speed up the reading. Movement of the disk 16 in the gimbal ring 21 is further limited by means of a pin 36 extending out from one of the lugs 15 and between stops 37 and 38 to prevent the spool from assuming a position at so great an angle to the axis of the drums that equilibrium would not quickly be attained or would be entirely prevented. Movement of the yoke and lever 23 is also limited, as by cooperation of the lower gimbal-supporting arm of member 23 with the forked stop 39, to maintain the spool opposite the drums.

In view of the fact that the spool member 12 is delicately mounted for accurate and sensitive response to speed differentials between the two drums, it will be obvious that the two flanges 13 and 14 should not be permitted to contact simultaneously with drum surfaces which have a very large speed differential as would be the case, for example, if one drum were rotating at full speed and the other were stationary. It is not feasible to bring the two drums up to speed together and, consequently, means may be provided to position the spool out of contact with the drums until such time as these are rotating at nearly the same speed. This condition will always prevail during measurements since the unknown may be geared up or down to bring the speed of the drum connected with it into approximate equality with that of the standard. The clutch mechanism to move the spool into and out of engagement with the drums includes the shaft 26 to which the rocking yoke and lever 23 is pinned, the shaft being mounted in bearing 40 on the base plate 41 of the instrument. This shaft passes through a lug 42 also mounted on the base and through a slidable collar 44. A rotatable jaw cam 45 bears against the lug 42 and mates with another non-rotatable jaw cam 46 carried by the collar 44. The cam 46 and collar 44 are slidable on the shaft 26 and bear against a coil spring 47 which in turn bears against a nut and washer 48 on the end of the shaft. The shaft, which is slidable in its bearings, is normally urged toward the spool side of the instrument by a spring 49 which engages one side of the lug 42 and a collar 51 pinned to the shaft. This spring thus maintains the spool out of engagement with the drum surfaces when a reading is not being made.

When it is desired to bring the spool into engagement with the drum surfaces, the jaw cam 45 is rotated in a clockwise direction by means of a lever 52 and link 53 pivotally attached thereto. This rotation of the cam causes the mating cam 46 to slide along the shaft 26, on which it is prevented from turning by means of pins 54 which permit only lateral motion of this cam. The collar 44 is thus forced against the spring 47 and the motion, thus transmitted, pulls the shaft in the opposite direction to the force exerted by the spring 49. This moves the yoke and lever 23 toward the drum surfaces and brings the spool, which is suspended in the yoke, into engagement with the drum surfaces. When the cam 45 is rotated counterclockwise, the spring 49 again urges the spool away from the drums.

These cams are operated by a mechanism under the control of the operator through a handle 55. This handle turns a shaft 56 which is mounted in bearings 57 and 58 on the base plate 41 and to the shaft are pinned collars 59 and 61 from which extend cams 62 and 63 respectively. The cam 62 engages a pin 64 mounted in forked link 53 straddling shaft 56 and clockwise turning of the shaft 56 by the handle 55 thus causes the cam 62 to push the pin 64 to the right, as seen in Fig. 3, and with it the link 53 which turns the jaw cam 45 and brings the spool into operative engagement with the drums 1 and 2. When it is desired to return the spool to the inoperative position, the shaft 56 is turned counterclockwise by handle 55, and a spring 65 pulls the link 53 to the left, as seen in Fig. 3, restoring the jaw cam 45 to its original position. At the same time that the link 53 is being forced to the right by clockwise rotation of shaft 56 when it is desired to take a reading, the cam 63 engages a pin 66 in a link 67 and forces this link to the left. The link operates a switch in switch box 68 to start the synchronous motor 9 running. A spring 69 placed on the link 67 between the switch box 68 and collar 71 aids in returning the link 67 to its original position and opening the switch when a reading has been completed. In Figure 1, as indicated by the position of handle 55, the spool is disengaged from contact with drums 1 and 2, while in Figure 3 the position of the handle indicates that the spool 12 is contacting said drums.

The operating mechanism herein described thus may adapt the speed comparator to situations where one of the drums is always rotated by the machine the speed of which is to be measured, periodic checking of the speed of some machines being necessary. An example of such a machine is that used for continuous spinning of artificial silk where the filaments must be drawn from a spinning bath at a constant rate of speed. This means that one of the drums, in the present instance drum 1, is always rotating while the other drum, drum 2, is rotated only when a reading is desired. The sensitively mounted spool 12 should not contact with the drums between readings since the unbalanced force set up by the one rotating drum would disarrange the spool mounting. Accordingly, the above described operating mechanism is adapted to bring the stationary drum up to speed before the spool is brought into contact with the drums. This is done by first turning the handle 55 clockwise through part of its throw, bringing cam 63 to some position as that indicated in Figure 9, which forces the rod 67 to the left and closes the switch 68. The synchronous motor 9 then commences to rotate and gradually brings the attached drum 2 up to a constant speed, say 1800 R. P. M. Due to the shape of cam 62, which is formed with a dwell for part of its working surface, the pin 64 and link 53 are not moved over by the partial throw of the handle 55 which closes the switch 68. A sufficient period may now be allowed to elapse for the motor to come up to speed and then the throw of the handle 55 may be completed to push the link 53 to the right and thus turn the jaw cam 45 which then forces the mating jaw cam 46 toward the spring 47 and thus moves the shaft 26 to bring the spool 12 into contact with both drums. The speed differential between the two drums is then read off the dial 27, which may be of frosted glass illuminated by a light 72. The instrument is then disconnected, by reversing the throw of the handle 55, the first part of the throw removing the cam 62 from contact with the pin 64 and thus permitting the spring 65 to pull the link 53 to the left, which turns the jaw cam 45 in the reverse direction. The spring 49 will now pull the shaft 26 in the opposite direction and force the spool out of contact with the drums. As the throw of the handle 55 is completed, the cam 63 is similarly moved away from the pin 66 and the spring 69 forces the link 67 to the right and opens the switch to the motor 9. The throw of the handle 55 for disconnecting the instrument may, of course, be completed without delay since the first portion of the throw moves the spool 12 out of contact with the drums 1 and 2 and the motor may then be permitted to come to rest without further attention. In connecting the instrument, however, the throw should not be completed until the synchronous motor has come up to speed and means may be provided to prevent such completion of the throw until the proper time.

The operation of the device will be apparent from the foregoing but a brief description of the principles involved will be given here. When the two drums 1 and 2 are rotating at exactly the same speed, the two bands where the flanges 13 and 14 of the spool contact, when the spool is in zero position, will be running at the same rate of speed and the spool will maintain a position equidistant from the edges of the drums if the latter are of the same dimensions. Should the speed of one drum differ from that of the other, however, these bands will assume correspondingly different speeds and one drum will tend to retard and the other will tend to accelerate the rotation of the spool with the result that the spool will instantly dip at a slight angle to the axis of the drums. In order to regain equilibrium, the spool, which is mounted for rotation about a plurality of different axes as stated, will run toward one side or the other in order to equalize the speed with which the two flanges are being driven. This position is one where the flanges can contact with bands on the respective drums having equal velocities and, since the drums are now rotating at different speeds, the location of the respective bands will be at different distances from the adjacent faces of the drums, an infinite number of peripheral speeds being presented by the conical or otherwise regularly varying surfaces of the drums. The spool will not come to rest laterally until it has found this new position of equilibrium but will, as a matter of fact, tend to over-correct and the dash pot 34 is, hence, provided to dampen the oscillations. When the spool has finally come to rest in its new position it has moved in a general lateral direction along its own axis, either to the left or to the right, according as the speed of the drum which is connected to the part whose speed is to be measured, is greater or less than the constant speed of the drum connected to the synchronous motor. This lateral motion is communicated through the link 29 to the gear segment 31 which turns the pinion 32 and the pointer 26 to effect a movement of the pointer which is proportional to the lateral movement of the spool. Adjustments can be made during calibration of the dial since the link 29 is adjustably connected to the gear segment 31. Since this lateral movement of the spool is a function of the difference in speed between the two drums, if any, there is thus provided an accurate indication of the speed of the part which is to be measured since the differential is based on the constant speed of the other drum connected to a synchronous motor. If it be assumed that the speed of the synchronous motor and its attached drum is 1800 R. P. M., then a difference on the dial of two or three or more revolutions per minute, which can readily be read, indicates a speed of the other drum of 1800 R. P. M. plus or minus the dial reading.

Since, in the operation of a speed comparator embodying the invention it is necessary that the rotating surfaces, when rotating at different angular speeds afford paths moving at equal linear speeds, it is apparent that the magnitude of the speed differential between the two drums may be limited for a given pair of drums by the requirement that they provide such paths of equal linear speeds. The gear box 7 may be provided to bring the speed differential between the two drums to such a magnitude that the paths of equal speed on the surfaces of the drums will lie within the bounds of the drums. For instance, if the angular speed of the measured part varies from the standard angular speed by an amount larger than the speed differential which may be measured by the given drums, the ratio of the gears in the gear box 7 may be changed to bring the speed of the drum driven by the part the speed of which is to be measured to near the speed of the drum driven by the standard, in which case the speed differential between the two drums may be determined as above indicated. The formula for determining the unknown speed will then include the ratio of the gears in the gear box 7. Great accuracy thus can be obtained by means of an instrument embodying the invention, since only the small differential between the speeds of the two drums is measured, and the indicator is required to indicate only this differential instead of the absolute speed of the part the speed of which is to be determined.

The instrument may be used for measuring the speed of rotation of any part or of any machine, one of the drums being connected through suitable gearing, or directly, to the rotating part to be measured and the other drum being driven by a synchronous motor or other means which provides a standard of constant unvarying speed. The instrument may be connected to the part whose speed is to be measured, permanently, as described above, or a coupling for ready attachment or detachment may be furnished so that the instrument may be used to measure the speeds of various parts of machines.

Obviously, with apparatus of this type it is possible to compare the speeds of any two rotating parts or shafts, since it is not necessary for all applications of the invention that one drum be driven by a standard speed device. It is also apparent that the invention may be used to advantage in determining when two parts or shafts are rotating at the same speed.

It is intended that the patent shall cover, by suitable expression in the appended claims, whatever features of patentable novelty reside in the invention.

What I claim is:

1. Apparatus for comparing the speed of a rotating part with a known standard which comprises a pair of drums each having a periphery varying regularly in a direction axially of the drum, means for driving one of said drums from the part the speed of which is being compared, means for driving the other drum from a source having a known constant speed of rotation, an element mounted for rotation and lateral movement contacting with each of said drums, an indicator, and mechanism connecting said indicator with said element to transmit to the former the lateral movement of the latter.

2. Apparatus for comparing the speed of a rotating part with a known standard which comprises a pair of aligned drums each having a periphery varying regularly in a direction axially of the drum, means for driving one of said drums from the part the speed of which is being compared, means for driving the other drum from a source having a known constant speed of rotation, an element freely mounted for rotation and generally axial movement contacting with each of said drums, an indicator, and means connecting said indicator with said element.

3. Apparatus for comparing the speeds of rotation of two rotating parts comprising two propinquant rotatable surfaces respectively rotating at speeds bearing direct ratios to the speeds of the rotating parts to which they correspond, said rotatable surfaces providing surface paths which move at equal linear speeds when said rotatable surfaces are rotated at different angular speeds; rotatable means in contact with said rotatable surfaces, said rotatable means being capable, in response to differences in angular speeds of said rotatable surfaces, of movement laterally of said rotatable surfaces to positions in which said rotatable means contacts paths of equal linear speeds on said rotatable surfaces; and indicating means responsive to movement of said rotatable means.

4. Apparatus for comparing the speeds of rotation of two rotating parts comprising two drums respectively rotated about the same axis at speeds bearing direct ratios to the speeds of the rotating parts to which said drums correspond, the peripheries of said drums regularly varying in such a manner that the diameter of one drum at any given distance from the end of said drum which is adjacent the other drum is equal to a corresponding diameter of the other drum at an equal distance from the end of said other drum which is adjacent said first-mentioned drum; an element mounted for rotation and generally axial movement contacting with each of said drums; and indicating means responsive to generally axial movement of said element.

5. Apparatus for comparing the speeds of rotation of two rotating parts comprising two drums respectively rotated about the same axis at speeds bearing direct ratios to the speeds of the rotating parts to which said drums correspond, said drums having conical peripheries such that the diameter of one drum at any given distance from the end of said drum which is adjacent the other drum is equal to a corresponding diameter of the other drum at an equal distance from the end of said other drum which is adjacent said first-mentioned drum; a spool freely mounted for rotation and generally axial movement, flanges on said spool making point contact with the respective drums; and an indicator connected to said spool and adapted to move in accordance with the generally axial movement thereof.

6. Apparatus for comparing the speeds of rotation of two rotating parts comprising two drums respectively rotated about the same axis at speeds bearing direct ratios to the speeds of the rotating parts to which said drums correspond, said drums having conical peripheries such that the diameter of one drum at any given distance from the end of said drum which is adjacent the other drum is equal to a corresponding diameter of the other drum at an equal distance from the end of said other drum which is adjacent said first-mentioned drum, said drums being disposed with the maximum diameters thereof adjacent; a spool freely mounted for rotation and generally axial movement, two flanges of said spool making point contact with their respective drums; and an indicator connected to said spool and adapted to move in accordance with the generally axial movement thereof.

7. Apparatus for comparing the speed of a rotating part with a known standard which comprises two propinquant rotatable surfaces each varying regularly in a direction parallel to the axis of the surface, means for driving one of said surfaces from the rotating part and the other from the known standard, an element mounted for rotation and universal movement, including generally axial movement, contacting with each of said rotatable surfaces, an indicator, and mechanism connecting said element with said indicator to move the latter in accordance with generally axial movement of the element.

8. In combination, two independently rotatable surfaces, a rotatable element capable of generally lateral movement in response to differences in the speeds of rotation of said rotatable surfaces positioned in driven contact with both of said rotatable surfaces, and means for moving said rotatable element into and out of contact with said surfaces.

9. In combination, two independently rotatable surfaces of revolution, a rotatable element capable of generally lateral movement in response to differences in speeds of rotation of said rotatable surfaces of revolution positioned in driven contact with said rotatable surfaces of revolution, and means responsive to generally lateral movement of said rotatable element for indicating differences in the speeds of rotation of said rotatable surfaces of revolution.

10. In combination, two independently rotatable surfaces, a rotatable element capable of generally lateral movement in response to differences in speeds of rotation of said rotatable surfaces positioned in driven contact with said rotatable surfaces, means for moving said rotatable element into and out of contact with said rotatable surfaces, and means responsive to generally lateral movement of said rotatable element for indicating differences in the speeds of rotation of said rotatable surfaces.

11. Apparatus comprising two propinquant surfaces of revolution respectively rotating at speeds bearing direct ratios to the speeds of independently rotating parts to which they correspond, at least one of said surfaces of revolution varying progressively in diameter from a minimum to a maximum; rotatable means in contact with said surfaces of revolution, said rotatable means being capable, while in contact therewith, of generally lateral movement across said surfaces of revolution in response to differences in speeds of rotation thereof; and indicating means responsive to generally lateral movement of said rotatable means to which such generally lateral movement is communicated.

12. Apparatus comprising two propinquant surfaces of revolution respectively rotating at speeds bearing direct ratios to the speeds of independently rotating parts to which they correspond, each of said surfaces of revolution varying progressively in diameter from a minimum to a maximum; rotatable means in contact with said surfaces of revolution, said rotatable means being capable, while in contact therewith, of generally lateral movement across said surfaces of revolution in response to differences in speeds of rotation thereof; and indicating means responsive to generally lateral movement of said rotatable means to which such generally lateral movement is communicated.

13. Apparatus comprising two propinquant inversely disposed surfaces of revolution respectively rotating at speeds bearing direct ratios to the speeds of independently rotating parts to which they correspond, each of said surfaces of revolution varying progressively in diameter from a minimum to a maximum; rotatable means in contact with said surfaces of revolution, said rotatable means being capable, while in contact therewith, of generally lateral movement across said surfaces of revolution in response to differences in speeds of rotation thereof and indicating means responsive to generally lateral movement of said rotatable means to which such generally lateral movement is communicated.

14. Apparatus for indicating relative speeds of rotation of two rotating parts comprising two corresponding propinquant inversely disposed frusto-conical surfaces respectively rotating at speeds bearing direct ratios to the speeds of the rotating parts to which they correspond; rotatable means in contact with said frusto-conical surfaces, said rotatable means being capable, while in contact therewith, of generally lateral movement across said frusto-conical surfaces in response to differences in speeds of rotation thereof; and relative speed indicating means responsive to generally lateral movement of said rotatable means to which relative speed indicating means such generally lateral movement is transmitted.

15. Apparatus for indicating relative speeds of rotation of two rotating parts comprising two corresponding propinquant frusto-conical surfaces respectively rotating at speeds bearing direct ratios to the speeds of the rotating parts to which they correspond; rotatable means in contact with said frusto-conical surfaces, said rotatable means being capable, while in contact therewith, of generally lateral movement across said frusto-conical surfaces in response to differences in speeds of rotation thereof; and relative speed indicating means responsive to generally lateral movement of said rotatable means to which relative speed indicating means such generally lateral movement is transmitted.

16. Apparatus for comparing the speeds of rotation of two rotating parts comprising two propinquant rotatable surfaces respectively rotating at speeds bearing direct ratios to the speeds of the rotating parts to which said rotatable surfaces correspond, each of said rotatable surfaces having portions thereof which move at different linear speeds as the surface rotates at any given angular speed; a rotatable element contacting both said rotatable surfaces and adapted to move during rotation thereof to positions with respect thereto in which the peripheral speeds of the portions of the rotatable element contacting said rotatable surfaces are the same as the linear speeds of the corresponding portions of the rotatable surfaces being so contacted; and indicating means responsive to movement of said rotatable element.

FOSTER F. HILLIX.